United States Patent
Schmidhammer et al.

(10) Patent No.: US 9,571,133 B2
(45) Date of Patent: Feb. 14, 2017

(54) DUPLEXER

(71) Applicant: EPCOS AG, Munich (DE)

(72) Inventors: Edgar Schmidhammer, Stein an der Traun (DE); Juha Ellae, Halikko (FI)

(73) Assignee: EPCOS AG, Munich (DE)

( * ) Notice: Subject to any disclaimer, the term of this patent is extended or adjusted under 35 U.S.C. 154(b) by 37 days.

(21) Appl. No.: 14/424,975

(22) PCT Filed: Jul. 29, 2013

(86) PCT No.: PCT/EP2013/065919
§ 371 (c)(1),
(2) Date: Feb. 27, 2015

(87) PCT Pub. No.: WO2014/032883
PCT Pub. Date: Mar. 6, 2014

(65) Prior Publication Data
US 2015/0222300 A1 Aug. 6, 2015

(30) Foreign Application Priority Data

Aug. 27, 2012 (DE) .................. 10 2012 107 877

(51) Int. Cl.
*H04B 7/005* (2006.01)
*H04B 1/04* (2006.01)
*H04B 1/52* (2015.01)
*H04L 5/14* (2006.01)

(52) U.S. Cl.
CPC .............. *H04B 1/0475* (2013.01); *H04B 1/52* (2013.01); *H04L 5/14* (2013.01)

(58) Field of Classification Search
CPC . H04B 1/0475; H04B 1/52; H04B 2001/0408; H04B 1/0458; H04B 1/58; H04B 1/581; H04L 5/14
See application file for complete search history.

(56) References Cited

U.S. PATENT DOCUMENTS

| 5,180,999 A | * | 1/1993 | Edwards | .................. H03H 7/01 333/117 |
| 8,385,305 B1 | * | 2/2013 | Negus | ................. H04W 76/025 370/310 |
| 8,723,619 B2 | * | 5/2014 | Weiß | ....................... H04B 1/52 333/117 |

(Continued)

FOREIGN PATENT DOCUMENTS

DE 602006000890 T2 6/2009
DE 102010046677 A1 3/2012

(Continued)

OTHER PUBLICATIONS

Chin, T.: "Compact S-I K alpha-Band CMOS Quadrature Hybrids with High Phase Balance Based on Multilayer Transformer Over-Coupling Technique"; IEEE Transactions on Microwave Theory and Techniques, vol. 57, No. 3, Mar. 1, 2009, pp. 708-715.

*Primary Examiner* — Kevin Mew
(74) *Attorney, Agent, or Firm* — McDermott Will & Emery LLP

(57) ABSTRACT

A duplexer having good insulation, small geometric dimensions and good decoupling of the transmit signal path from an antenna which may have poor matching is specified. To that end, the duplexer comprises two transmit filters, a receive filter and two 90° hybrids.

11 Claims, 7 Drawing Sheets

(56) References Cited

U.S. PATENT DOCUMENTS

| | | | |
|---|---|---|---|
| 2004/0239441 A1* | 12/2004 | Baras | H01P 5/22 333/120 |
| 2005/0070232 A1 | 3/2005 | Mages | |
| 2006/0019611 A1 | 1/2006 | Mages | |
| 2007/0194859 A1* | 8/2007 | Brobston | H03H 7/40 333/17.3 |
| 2008/0032745 A1 | 2/2008 | Kim et al. | |
| 2009/0093270 A1* | 4/2009 | Block | H04B 1/52 455/552.1 |
| 2010/0102899 A1* | 4/2010 | Engel | H01P 1/211 333/117 |
| 2010/0109800 A1 | 5/2010 | Ueda et al. | |
| 2010/0148886 A1 | 6/2010 | Inoue et al. | |
| 2011/0069644 A1 | 3/2011 | Kim et al. | |
| 2011/0075312 A1* | 3/2011 | Alkan | H03H 7/461 361/119 |
| 2011/0204992 A1* | 8/2011 | McIntyre | H01P 5/18 333/116 |
| 2012/0170624 A1* | 7/2012 | Rozenblit | H03G 3/3042 375/219 |
| 2013/0188753 A1* | 7/2013 | Tarlazzi | H04B 7/024 375/299 |
| 2014/0049337 A1* | 2/2014 | Schmidhammer | 333/117 |

FOREIGN PATENT DOCUMENTS

| | | |
|---|---|---|
| DE | 102011114642 A1 | 4/2013 |
| DE | 102012107244 A1 | 2/2014 |
| EP | 1758200 B1 | 4/2008 |
| JP | 2006135411 A | 5/2006 |
| JP | 2008526155 A | 7/2008 |
| WO | 03/038995 A1 | 5/2003 |
| WO | WO-2009025056 A1 | 2/2009 |
| WO | WO-2009078095 A1 | 6/2009 |
| WO | 2011/072723 A1 | 6/2011 |
| WO | 2012/117072 A2 | 9/2012 |

* cited by examiner

DUPLEXER

The invention relates to duplexers, e.g. duplexers for mobile communication devices.

Duplexers in mobile communication devices are frequency filters which ensure that high-power transmit signals from a transmit signal path cannot penetrate into a receive signal path but are radiated via an antenna. Furthermore, signals received via the antenna should be conducted into the receive signal path with the least possible losses.

Correspondingly, duplexers should have good isolation, i.e. good separation between transmit signal path and receive signal path. Furthermore, duplexers should have high selectivity, i.e. low insertion loss for frequencies to be passed and high insertion loss for frequencies to be blocked.

In addition, antennas having an antenna impedance which is not matched can require increased transmitting power and thus an increased power consumption in mobile communication devices. Duplexers should, therefore, decouple the antenna and at least the transmit signal path to such an extent that the mismatch of the antenna does not impact the operation of the transmit amplifier on the transmit signal path. The insensitivity of the transmit signal path to a mismatch of the antenna should thus be increased.

From DE 10 2010 046 677, circuit arrangements are known which provide for good isolation, high selectivity and good decoupling of the transmit signal path from an antenna having poor impedance matching.

Furthermore, there is a requirement to provide duplexers which have a small space requirement. Furthermore, such duplexers should be advantageously producible and have a high power compatibility. Similarly, long life and an improved linearity is desired.

In this context, the term duplexer is understood to mean the technical product which comprises circuit elements of a duplexer circuit and is implemented as duplexer component.

It is an object of the invention, therefore, to specify such a duplexer. This object is achieved by the duplexer according to claim 1. The dependent claims then specify advantageous embodiments of the invention, the features contained therein and the features described in the text which follows being combinable with one another independently of one another in order to obtain an individually matched duplexer.

A duplexer comprises an antenna terminal, a transmit terminal and a receive terminal. The duplexer also comprises two transmit filters and one receive filter and furthermore a first and a second 90° hybrid. In this context, each of the two hybrids has in each case a first, a second, a third and a fourth terminal. The antenna terminal is interconnected with the first terminal of the first hybrid. The receive filter is interconnected between the third terminal of the first hybrid and the receive terminal. One of the transmit filters is interconnected between the fourth terminal of the first hybrid and the second terminal of the second hybrid. The other one of the transmit filters is interconnected between the second terminal of the first hybrid and the fourth terminal of the second hybrid. The transmit terminal is interconnected with the first terminal of the second hybrid.

It is possible that the duplexer comprises a component having a first carrier substrate. Conductor patterns of the transmit filters are then arranged on the first carrier substrate.

Conventional duplexer circuits are based on the concept of configuring a transmit filter, a receive filter and an impedance matching circuit in such a manner, and to interconnect them with one another in such a manner that a desired and set interaction of these circuit components leads to the transmission characteristics of a duplexer. In particular, the impedance matching circuit in combination with the receive filter produces a change in the impedance at transmit signal frequencies so that good isolation is obtained between the transmit signal path and the receive signal path.

In contrast, the present invention is based on the concept of separating transmit filter and receive filter and possibly matching components from one another. And this in such a manner that a mismatch of the antenna has low or no disadvantageous effects on the operation of a transmit signal amplifier on the transmit signal path. In order to achieve this separation, the hybrids mentioned initially are interconnected with one another in the manner mentioned initially. This results in insensitivity of at least the transmit signal path from a mismatched antenna.

The circuit arrangements of DE 10 2010 046 677 also comprise hybrids for separating the filters. However, at least three hybrids and four single-filter RF filters, that is to say three hybrids and two complete duplexer circuits are needed for this purpose. In contrast, the duplexer of the present invention only needs two hybrids and three single filters. Required antenna coils for implementing a phase shifter network are also to be implemented in the simplest possible manner. Thus, a duplexer is specified which, with comparable performance, provides for a saving on components and space of up to 50%.

In the case of receive frequencies, the transmit filters can be reflecting. Receive signals which are received by the antenna are then output by the first hybrid in the direction of the two transmit filters. The signals are reflected at the transmit filters and, again passing through the first hybrid, pass via the third terminal of the hybrid into the receive filter. Signals which are coupled in from the transmit terminal into the duplexer and have frequency components of the receive frequencies are conducted via the second hybrid to the reflecting transmit filters and reflected in such a manner that they are bypassed to ground again passing through the second hybrid. Transmit signals within the transmit frequency range, on the other hand, can pass through the two transmit filters and are conducted directly to the antenna, passing through the first hybrid.

Between the antenna and the transmit terminal, two 90° hybrids are thus interconnected which produce the necessary decoupling for the required insensitivity of the transmit signal path to any antenna mismatch. The reflectivity of the transmit filters at receive signal frequencies produces very good isolation of the duplexer at frequencies outside the transmit frequency range. In comparison with the circuit arrangement of DE 10 2010 046 677, the number of interconnected components is reduced in such a manner that, on the one hand, the geometric dimensions of a corresponding component, e.g. the space requirement or the overall height, are reduced. On the other hand, heating of the duplexer is reduced due to the reduced number of components so that the power compatibility is improved and the service life is increased. Furthermore, there is also an improvement in the linearity of a corresponding component. Furthermore, the production costs of a corresponding component are lowered. The increased service life and the improved power compatibility, on the one hand, and the reduced number of components, on the other hand, increase the reliability of the duplexer.

In one embodiment of the duplexer, the first terminals of the hybrids are input terminals. There is a phase difference of about 90° present between output signals of the second and fourth terminals, which can be output terminals.

Hybrids to be considered are all power divider circuits with four terminals and a phase difference of about 90° between two of the terminals.

The hybrids can comprise, in particular, signal lines integrated in a multi-layer substrate and capacitive or inductive circuit components.

In one embodiment, the duplexer comprises an impedance element which interconnects the third terminal of the second hybrid with ground. This impedance element can be a resistive element via which signals are bypassed to ground in the case of receive frequencies from the transmit signal path.

In one embodiment of the duplexer, each of the hybrids outputs an RF power present at the first terminal in equal parts at terminals 2 and 4. With respect to terminals 1, 2 and 4, a hybrid thus acts as a 3 dB power divider circuit, at least in the case of RF signals in the vicinity of transmit or receive frequency ranges.

In one embodiment, both hybrids and/or both transmit filters have the same configuration.

This reduces the expenditure for developing and optimizing a duplexer.

In one embodiment, receive signals are conveyed from terminals 2 and 4 from the first hybrid to the transmit filters. These receive signals are then reflected by the transmit filters and conveyed to the receive filter via the third terminal of the first hybrid.

In one embodiment, transmit signals, particularly those which are not within the pass band of the transmit filters cancel one another mutually at the third terminal of the first duplexer. Any remaining rest is bypassed to ground.

In one embodiment, the standing wave ratio in the transmit filter is subject to lower fluctuations in a transmit frequency band than on the receive path in a receive frequency band.

As mentioned initially, the two hybrids decouple the transmit terminal from an antenna which may not be matched. In this context, the standing wave ratio (SWR) is a measure of the match. The standing wave ratio for transmit signals is therefore significant in as much as an unfavorable standing wave ratio on the transmit signal path requires increased power of the power amplifier on the transmit signal path. It is particularly in the case of mobile communication devices which only have access to a finite amount of energy that an advantageous standing wave ratio on the transmit signal path is of particular importance, therefore.

The invention provides for a standing wave ratio which is advantageous in such a manner that methods of envelope tracking can be applied meaningfully for increasing the efficiency of a power amplifier. In envelope tracking, it is essentially the envelope of the transmit signals which is analyzed. If the envelope exhibits less spacing from the x axis, less RF power has to be radiated. If then the supply voltage of the power amplifier on the transmit signal path is reduced, it operates with improved efficiency so that energy is saved overall.

In one relevant embodiment, the duplexer comprises a control loop in which the transmit power is controlled on the basis of the envelope of the transmit signal.

In one embodiment, the duplexer comprises a power amplifier which is connected between the transmit terminal and the second hybrid.

In one embodiment, the duplexer comprises an in-phase power amplifier and a quadrature power amplifier. The in-phase power amplifier can be interconnected together with the first transmit filter in one of two parallel sections of the transmit signal path between the hybrids whilst the quadrature power amplifier is interconnected with the other transmit filter in each case in the in each case other parallel section between the two hybrids.

In this arrangement, each of the two power amplifiers has to produce only half the RF power compared with conventional duplexer circuits so that the linearity of the duplexer is improved.

The linearity is improved particularly with respect to the triple-beat characteristic and the IMD characteristic.

In the triple-beat characteristic, three signals, e.g. two transmit signals and one receive signal are mixed. Frequency components arising from this can then lead to unwanted signals in the receiver and increase the noise level.

IMD (Intermodulation Distortion) is the mixing of two signals in which case frequency components at receive frequencies can also be produced.

In one embodiment, the duplexer comprises a first power amplifier, an in-phase power amplifier and a quadrature power amplifier. The duplexer also comprises a third and a fourth hybrid and a switch arrangement. In this context, the in-phase power amplifier and the quadrature power amplifier are interconnected on parallel signal paths between terminals 2 and 4 of the hybrids 3 and 4. The switch arrangement interconnects the second terminals of the hybrids 3 and 4 either in each case with ground or with one another.

This specifies an option which is simple to implement to add the two power amplifiers in-phase power amplifier and quadrature power amplifier combined to the signal path or to separate them from the signal path.

In one embodiment, the center frequency of the second hybrid is moved towards the direction of the center frequency of a transmit frequency band. This achieves further improvement in the isolation in the transmit frequency range.

In one embodiment of the duplexer, at least one of the hybrids comprises coupled transformers. It is then possible to easily adjust the ratio of the powers delivered at the two output terminals, on the one hand. On the other hand, it is easy to achieve impedance matching between the circuit components interconnected with the hybrid.

In one embodiment of the duplexer, the transmit filter and receive filter operate with acoustic waves. The filters used are then filters operating with surface acoustic waves (SAW), with guided bulk acoustic waves (GBAW) and with bulk acoustic waves (BAW). Such filters allow, in particular, small dimensions of corresponding duplexer components since the individual filters can be produced with small geometric dimensions. By cleverly arranging the filters and/or the hybrids relative to one another, it is thus also possible to have a duplexer having small dimensions.

In one embodiment, the component additionally comprises an inductive element, e.g. as antenna inductance.

It is possible that the duplexer is operated in each case single-ended, i.e. unbalanced to ground, or balanced to ground at the transmitter or receiving end. Whether the duplexer is operated single-ended or balanced at the receiving end is of no importance to the number of hybrids. In both cases, only two hybrids are necessary.

It is possible that the duplexer comprises circuit components for implementing a phase shifter network, e.g. for impedance matching between transmit signal path and receive signal path, e.g. by means of antenna coils. Furthermore, the duplexer can comprise parallel coils on the receive signal path for improving the signal quality. By means of the parallel coils, an improvement of the match to a power amplifier on the transmit signal path can be achieved.

Receive signals are conducted through the hybrid and split into a signal displaced by 0° and a signal displaced by 90°. These signals are reflected at the transmit filters and added together again with 0° and 90° phase shift by the hybrid. Overall, the summation results in a phase angle of 0° for the first signal but 180° for the second signal.

It is possible to use the duplexer in long-term evolution systems (LTE). Since there are two transmit filters instead of one transmit filter, the power to be processed by each filter is less by a factor of 2. It is particularly in LTE systems having a high crest factor which characterizes the probability and the magnitude of excess power that the service life is considerably extended.

The input and output impedances to be considered for various circuit components of the duplexers are 35 Ω, 50Ω and 100Ω. The antenna can then be connected with 50Ω. Signal lines which are balanced can have on impedance of 100Ω. A power amplifier can have an output impedance of, e.g., 7Ω. A transmit filter can have an input impedance of 35Ω. A transformation network can transform the output impedance of the power amplifier to the input impedance of a transmit filter.

In particular, a transformation network can be designed to have a single stage. The transformation of the 35Ω of the input impedance of the transmit filter to the 50Ω of the output impedance can be handled by the transmit filter itself. The impedance transformation from 50Ω to 100Ω can be performed by the receive filter itself.

Use is possible with the following transmit (TX) and receive (RX) frequencies.

| Band No. | Uplink band (TX) [MHz] | Downlink band (RX) [MHz] |
|---|---|---|
| 1 | 1920-1980 | 2110-2170 |
| 2 | 1850-1910 | 1930-1990 |
| 3 | 1710-1785 | 1805-1880 |
| 4 | 1710-1755 | 2110-2155 |
| 5 | 824-849 | 869-894 |
| 6 | 830-840 | 875-885 |
| 7 | 2500-2570 | 2620-2690 |
| 8 | 880-915 | 925960 |
| 9 | 1749.9-1784.9 | 1844.9-1879.9 |
| 10 | 1710-1770 | 2110-2170 |
| 11 | 1427.9-1447.9 | 1475.9-1495.9 |
| 12 | 699-716 | 729-746 |
| 13 | 777-787 | 746-756 |
| 14 | 788-798 | 758-768 |
| 17 | 704-716 | 734-746 |
| 18 | 815-830 | 860-875 |
| 19 | 830-845 | 875-890 |
| 20 | 832-862 | 791-821 |
| 21 | 1447.9-1462.9 | 1495.9-1510.9 |
| 22 | 3410-3500 | 3510-3600 |
| 23 | 2000-2020 | 2180-2200 |
| 24 | 1626.5-1660.5 | 1525-1559 |
| 25 | 1850-1915 | 1930-1995 |
| 26 | 814-849 | 859-894 |

The transmit frequencies of bands 5, 6, 8, 12, 13, 14, 17, 18, 19, 20 and 26 are relatively close to one another. The hybrid at the transmit terminal side can then be designed in such a manner that more than one frequency band is taken into consideration. This is efficiently possible since a power amplifier usually also works with a somewhat wider bandwidth so that several frequency bands can be covered here with one power amplifier. In particular, it is possible to use tunable transmit filters instead of transmit filters having a fixed frequency range. Thus, a multiplicity of frequency bands or wide frequency ranges can be covered with a few transmit filters.

A small structure of a corresponding component is furthermore also achieved by the following features: Conductor patterns, e.g. of the transmit filters, can be arranged on a first side of the carrier substrate. Conductor patterns of the receive filter and of the inductive element are arranged, e.g., on a second side of the first carrier substrate or on a second carrier substrate.

In one embodiment, at least one of the hybrids is designed as IPD (Integrated Passive Device) or as coupled transformers.

Both IPDs and coupled transformers of the hybrids can be integrated in a simple but efficient manner in a possibly multi-layered substrate and interconnected with other circuit components which are arranged on or below or also in the substrate.

In one embodiment, the second terminal of at least one hybrid is interconnected with ground via a resistive element arranged in the component or on the component.

In one embodiment, the transmit filters and the receive filter are arranged in a sandwich structure having two substrates. Conductor patterns of the hybrids are integrated in a further substrate. The sandwich structure and the further substrate are interconnected via electrically conductive connections. Using a sandwich structure provides an increased degree of integration. Combining the sandwich structure with the further substrate further increases the density of integration. Although the various circuit elements are arranged very closely to one another because of the high density of integration, a very good isolation is obtained due to the interconnection and separation of the filters by the hybrids mentioned initially.

In one embodiment, the duplexer comprises a power amplifier which is arranged in or on the first, second or a further substrate. In particular, a joint integration of active circuit components based on semiconductor technology, together with passive circuit components in one and the same component and/or substrate is possible. SESUB (Silicon Embedding Substrate) integration technology allows the integration of not only passive electronic components such as capacitors as capacitive elements, inductances as inductive elements and varistors or SAW and BAW filter components but also semiconductor components. Thus, using SESUBs, inter alia highly integrated ASICs (Application-Specific Integrated Circuits) and controller dies can also be embedded directly in substrate layers, and this with a high number of input and output terminals. Furthermore, components can be arranged on the top of a substrate or of a substrate stack and interconnected. Thus, modules and SIPs (System in Package) can be implemented with small dimensions. In particular, the overall height can be reduced by about 35% in comparison with conventional components.

In one embodiment, the duplexer comprises at least one matching network, e.g. for impedance matching. The matching network can be arranged in or on the first, second or a further substrate.

In one embodiment, the component is also provided for being arranged on a circuit board, e.g. an external circuit environment, and for being connected to and interconnected with the circuit board.

Such a duplexer can thus be integrated easily in a pre-existing circuit environment of a mobile communication device, e.g. a front-end circuit.

In one embodiment, the duplexer is manufactured in DSSP housing technology, where DSSP stands for Die-Sized SAW Package and provides for up to 85% smaller components compared with CSSP components (CSSP=Chip-Sized SAW Package).

In the text which follows, the duplexer will be explained in greater detail with reference to exemplary embodiments and associated diagrammatic figures. The figures show features which can be used individually or in combination.

Figure 3:
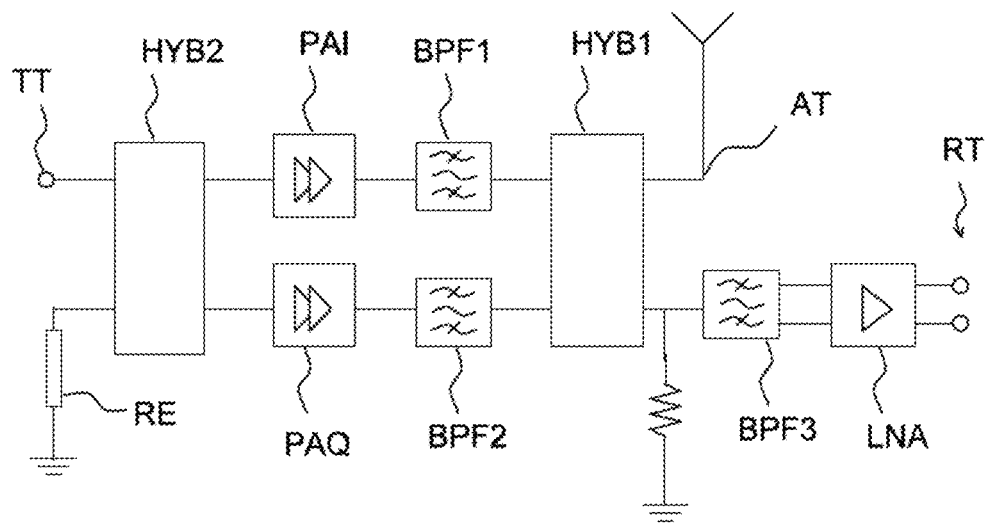
Figure 4:
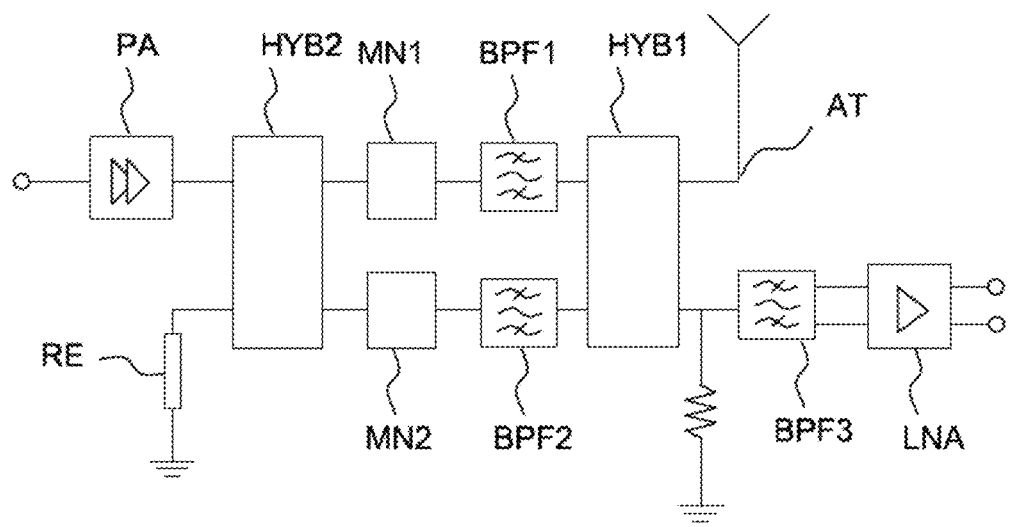
Figure 5:
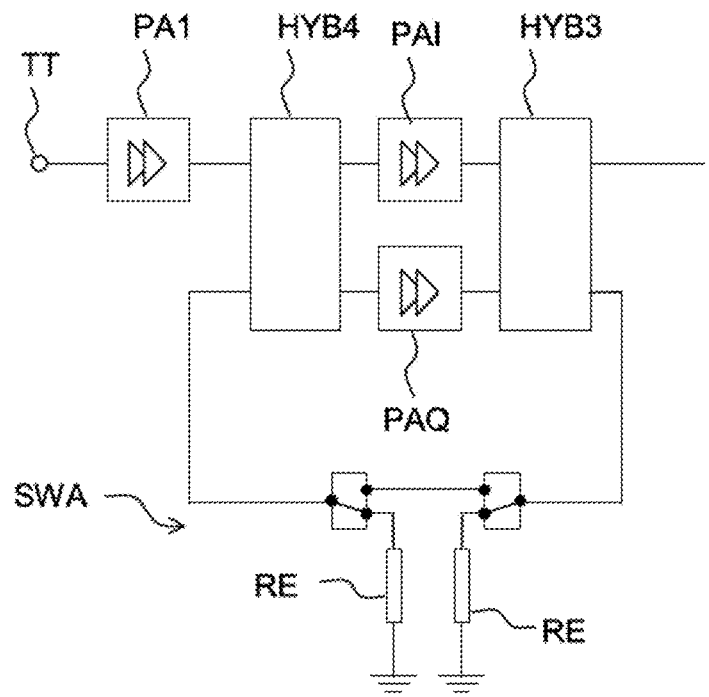
Figure 6:
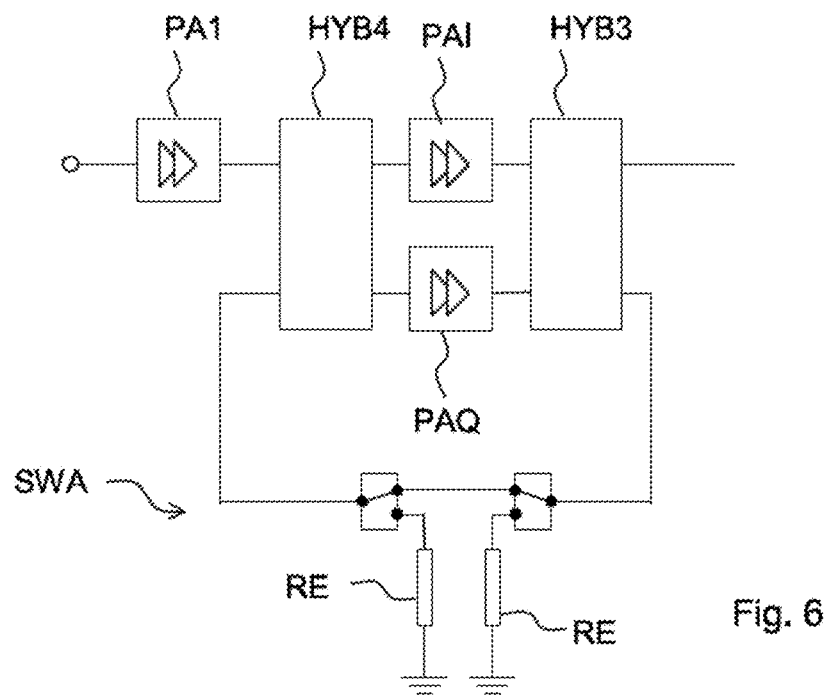
Figure 7:
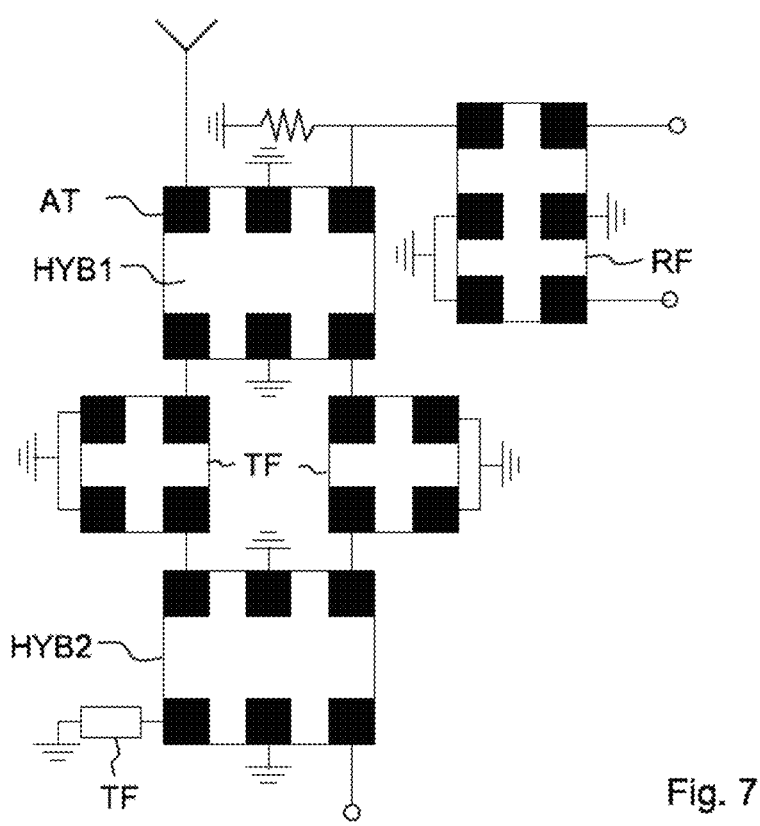
Figure 8:
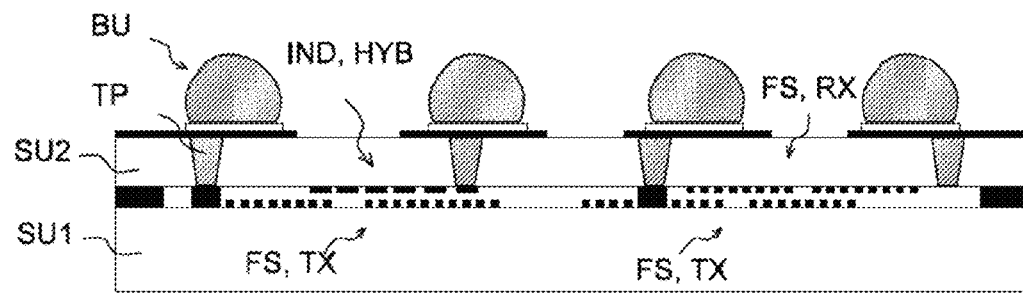
Figure 9:
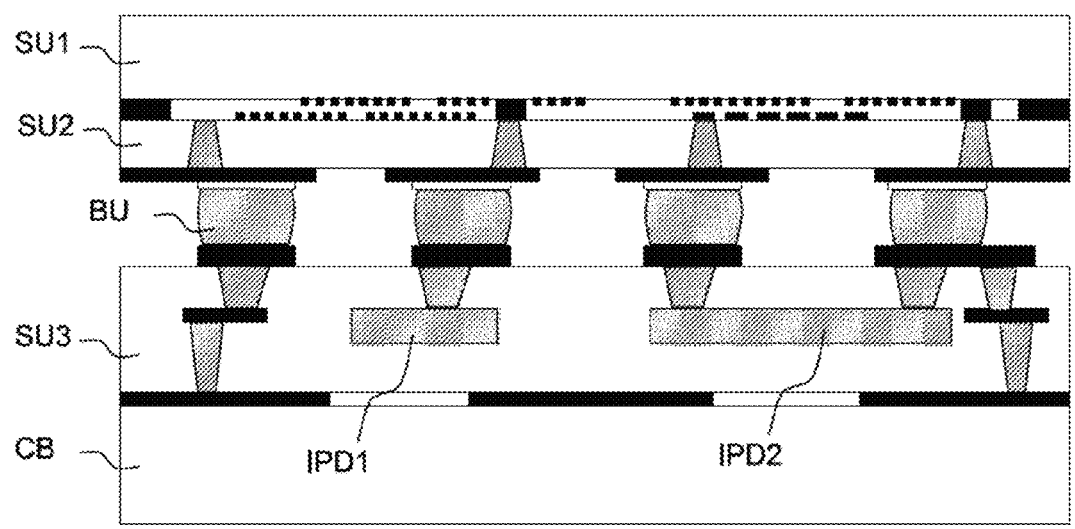
Figure 10:
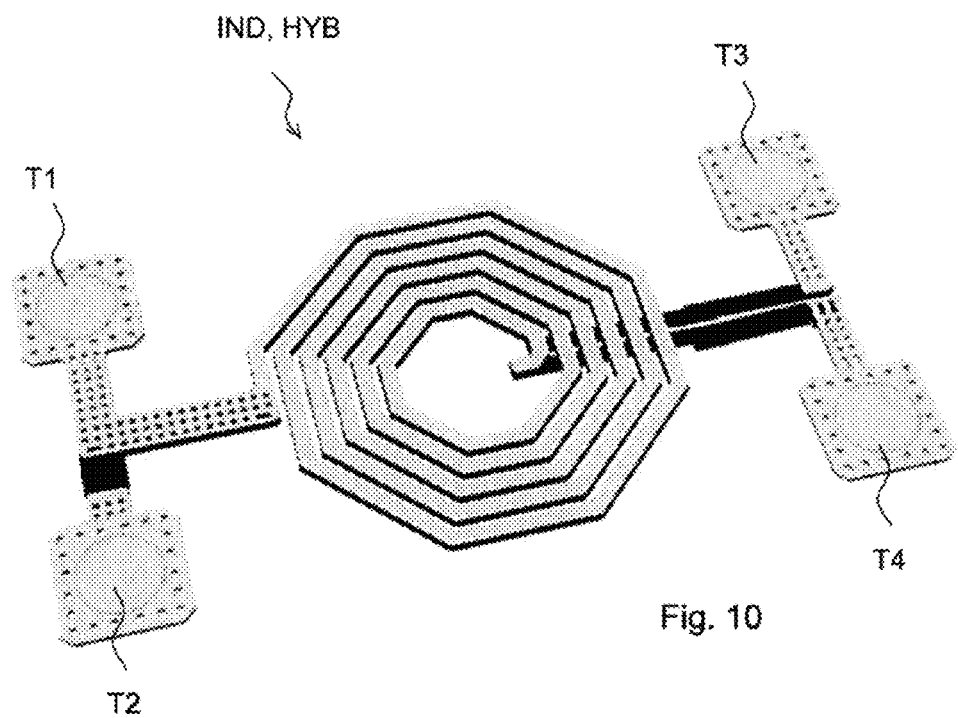
Figure 11:
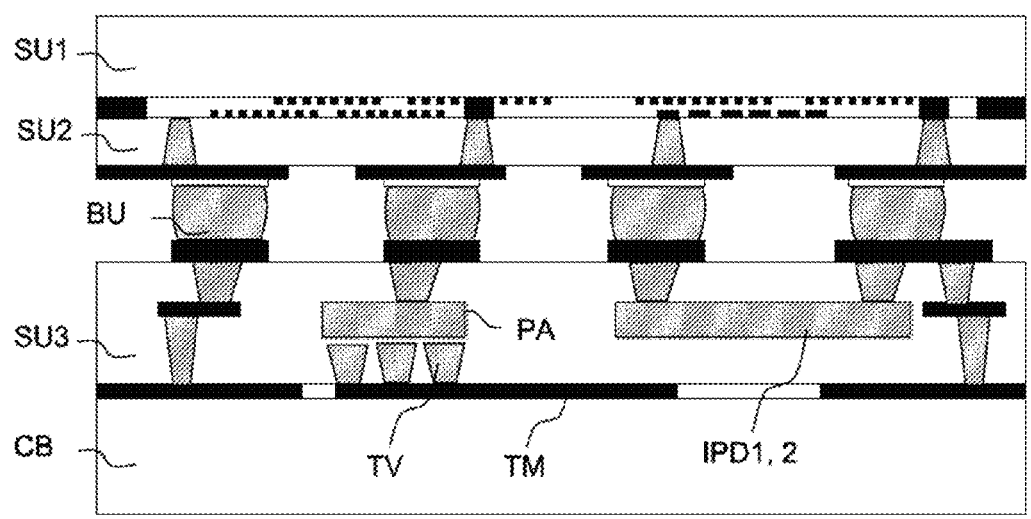
Figure 12:
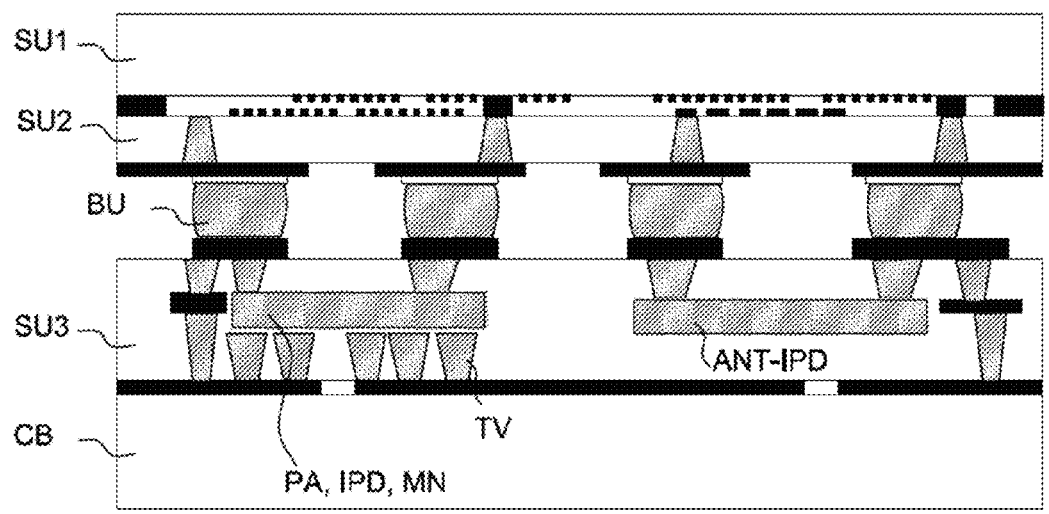
Figure 13:
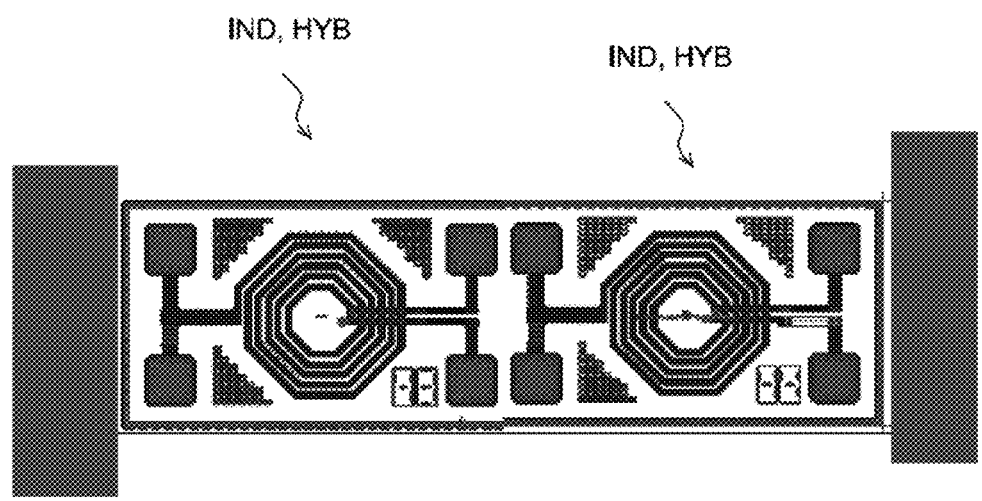

FIG. 3 shows an arrangement of the duplexer having two amplifiers on the transmit signal path, FIG. 4 shows an arrangement of the duplexer having matching networks on the transmit signal path, FIG. 5 shows an arrangement of the duplexer having a first switch position of a circuit arrangement, FIG. 6 shows the arrangement of the circuit arrangement of FIG. 5 with a varied switch position, FIG. 7 shows a possible arrangement of terminals of the filters and of the hybrids, FIG. 8 shows the sandwich structure of two chip substrates, FIG. 9 shows an arrangement of a duplexer having a high degree of integration, FIG. 10 shows an arrangement of a 0°/90° 3-dB hybrid, FIG. 11 shows an arrangement of a duplexer having heat conductor patterns, FIG. 12 shows a further arrangement of a duplexer having a high degree of integration and FIG. 13 shows an arrangement of two 0°/90° 3-dB hybrids next to one another.

Figure 1:
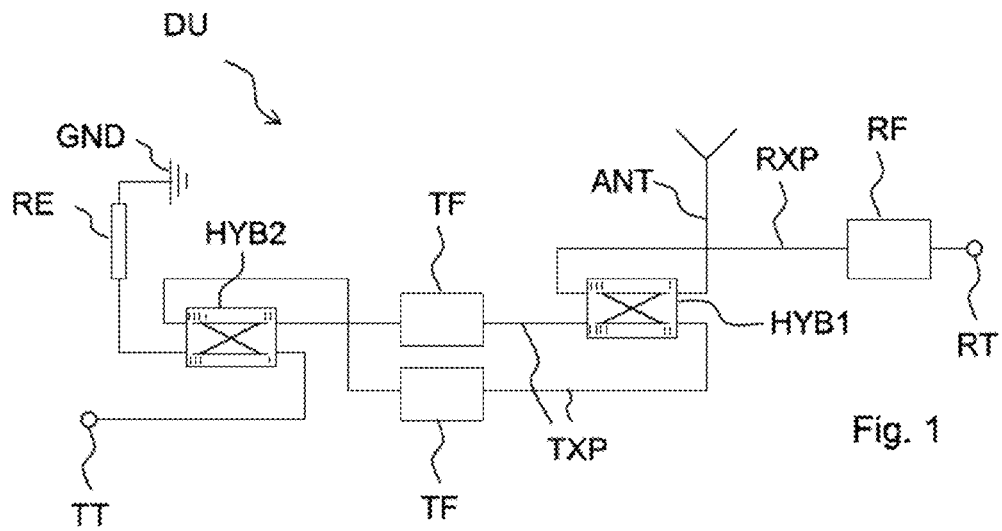
FIG. 1 shows a simple embodiment of the duplexer.

FIG. 1 shows a basic form of the duplexer DU with a first hybrid HYB1 and a second hybrid HYB2. Between the second terminal II of the first hybrid HYB1 and the third terminal III of the second hybrid HYB2, a transmit filter TF is interconnected. Between the third terminal III of the first hybrid HYB1 and the second terminal II of the second hybrid HYB2, a further transmit filter TF is interconnected in parallel with the transmit filter TF mentioned above. The two transmit filters TF are thus interconnected in parallel sections of the transmit signal path TXP. The first hybrid HYB1 is interconnected via its first terminal I with the antenna ANT. Between the third terminal III of the first hybrid HYB1 and the receive terminal RT, a transmit filter RF is interconnected on the transmit signal path TXP.

The first terminal I of the second hybrid HYB2 is interconnected with the transmit terminal TT. The third terminal III of the second hybrid HYB2 is interconnected with ground GND via an impedance element, e.g. via a resistive element RE.

By means of such a duplexer DU, the objects mentioned initially are achieved.

Figure 2:
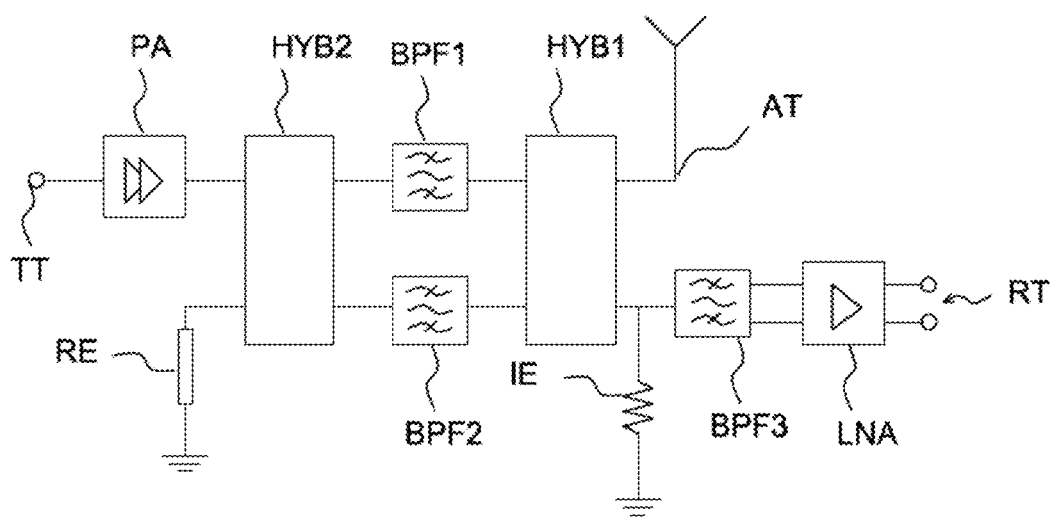
FIG. 2 shows a further arrangement of the duplexer.

FIG. 2 shows an embodiment of the duplexer, the two transmit filters TF being arranged as bandpass filters BPF1, BPF2. The terminal of the first hybrid HYB1 which is interconnected with the receive signal path is interconnected with ground via an impedance element IE. The receive filter is also arranged as bandpass filter BPF3. In this context, the receive filter BPF3 can be used as BALUN (Balanced/Unbalanced Converter) and forward a receive signal carried balanced to a low-noise amplifier (LNA) so that the receive terminal RT is arranged balanced. Between the transmit terminal TT and the second hybrid HYB2, a power amplifier (PA) is interconnected.

FIG. 3 shows an arrangement of the duplexer, a further power amplifier being interconnected in the two parallel sections of the transmit signal path instead of or additionally to the power amplifier PA of FIG. 2. Thus, one segment of the transmit signal path comprises an in-phase amplifier PAI whilst the other segment comprises a quadrature power amplifier PAQ. Between the two amplifiers PAI, PAQ and the first hybrid HYB1, the corresponding transmit filter BPF1, BPF2 can be interconnected. However, it is also possible that the amplifiers are interconnected between the filters and the first hybrid.

FIG. 4 shows an arrangement of the duplexer, wherein matching networks MN1, MN2 for impedance matching, e.g. between the output impedance of the second hybrid HYB2 and of the transmit filters BPF1, BPF2 or between the transmit filters and the first hybrid HYB1 are arranged in the parallel segments of the transmit signal path.

FIG. 5 shows an optional part of the transmit signal path which can be interconnected between the transmit terminal TT and the second hybrid HYB2. This optional part comprises a third hybrid HYB3 and a fourth hybrid HYB4, between which a power amplifier PAI, PAQ is in each case interconnected on parallel part-paths. A terminal of the third hybrid HYB3 and a terminal of the fourth hybrid HYB4 are interconnected with a circuit arrangement SWA. The switch arrangement SAW comprises two switches which can have in each case at least two switch conditions. One switch condition correspondingly interconnects one of the two hybrids HYB3, HYB4 with ground via one resistive element RE each. The respective other switch position interconnects the terminals of the hybrids HYB3, HYB4 with one another. This provides a bypass to the in-phase power amplifier PAI and to the quadrature power amplifier PAQ: in the case of a high transmit power, the two power amplifiers PAI, PAQ are needed. The respective terminal of the two hybrids HYB3 and HYB4 is then interconnected with ground by the terminating resistor shown by the resistive element RE. The signal to be amplified is then amplified first by the first power amplifier PA1. Subsequently, the amplified signal is split up by the fourth hybrid HYB4 and each individual signal is amplified. Subsequently, the signal amplified in this way is combined again to form a single signal by the third hybrid HYB3 and forwarded to the second hybrid, e.g. of FIG. 1.

If the power needed is lower, the two corresponding terminals of the hybrids HYB3, HYB4 are interconnected with one another via the switch arrangement SWA. Because of the lower power, the power amplifiers PAI, PAQ can be switched off and are then highly reflective. The power delivered by the first power amplifier PA1 is reflected at the power amplifiers PAI, PAQ and sent via the isolation port of the fourth hybrid HYB4 and via the isolation port of the third hybrid HYB3 to the outputs of the power amplifiers PAI, PAQ. From there, they are reflected again and forwarded as usual in the direction of the second hybrid HYB2, e.g. of FIG. 1, via the terminal of hybrid HYB3.

FIG. 5 thus shows a situation in which the power amplifiers PAI, PAQ support the first power amplifier PA1. FIG. 6 shows the case in which the power amplifiers PAI, PAQ are switched off and the power delivered by the first power amplifier PA1 is coupled directly into the third hybrid HYB3 by the fourth hybrid HYB4.

FIG. 7 shows a possible arrangement of the hybrids HYB1, HYB2, transmit filter TF and receive filter RF next to one another. Since the number of circuit components is reduced compared with the circuit arrangements of DE 10 2012 046 677, a miniaturized duplexer component can be obtained if these circuit components are arranged in a coplanar manner on the side of a first substrate.

FIG. 8 shows a cross section through a duplexer component having a first substrate SU1 and a second substrate SU2. The first substrate SU1 and the second substrate SU2 are joined together and form a sandwich structure. It is possible that filter structures FS of the transmit filters TX are arranged on the surface of one of the substrates, e.g. of the first substrate SU1. Filter structures FS of the receive filter RX can be arranged on the side of the second substrate SU2 facing the first substrate. Circuit elements of the hybrids HYB, e.g. inductive elements IND, can also be arranged on the side of the second substrate SU2 facing the first substrate. The circuit elements of a hybrid or of a number of hybrids HYB can be, in particular, the coils of coupled transformers. The component shown in FIG. 8 can also comprise bump connections BU by means of which a sandwich structure can be interconnected with further circuit components of the duplexer.

Thus, FIG. 9 shows, for example, an embodiment of a duplexer component in which the sandwich structure comprising the first substrate SU1 and the second substrate SU2 is connected to and interconnected with a further, third substrate SU3 via bump connections. The third substrate SU3 can be a multi-layer substrate with integrated circuit elements and/or further circuit elements. Thus, the third substrate SU3 can comprise integrated passive circuit components IPD1, IPD2. These circuit components IPD1, IPD2 can be arranged in intermediate layers of the substrate SU3 and interconnected with other circuit components via plated-through holes TP. The component comprising the substrates SU1, SU2, SU3 can be connected to and interconnected with a further substrate or a circuit board CB. Each of the substrates SU1, SU2, SU3 and particularly the third substrate SU3 can be based on SESUB technology or any other integration technology. In particular, it is possible that the needed hybrids are integrated as IPD in an SESUB substrate. The duplexer can thus be constructed in an extremely compact manner and nevertheless achieve good isolation. In particular, it is possible that the duplexer comprising hybrids can be obtained to be only insignificantly larger than a standard duplexer without hybrids.

FIG. 10 shows an exemplary embodiment of a 0°/90° 3-dB hybrid in IPD technology. The hybrid comprises at least two windings coupled with one another electromagnetically, which are arranged above one another for the purpose of coupling. The hybrid can be contacted via respective terminal areas T1, T2, T3, T4.

In particular, it is possible that hybrids arranged in IPD technology in an SESUB substrate are arranged next to one another.

Similarly, it is possible that terminating resistors are constructed in IPD technology.

The windings of two-in-one hybrids can then be oriented arbitrarily with respect to one another. It is thus possible that the hybrids are arranged identically next to one another or mirror-inverted, e.g. axially symmetrically or point-symmetrically next to one another.

FIG. 11 shows an arrangement of a duplexer component, with the third substrate SU3 being arranged as multi-layer substrate having integrated circuit components. Thus, the third substrate comprises at least one power amplifier PA and one or both hybrids in IPD technology IPD1, 2. The power amplifier PA comprises semiconductor components in which waste heat can be generated since it can be bypassed via heat-conducting thermal vias (TV) to the circuit board CB, which can be a main board. The heat bypassed through the thermal vias TV can be delivered to a metallization, applied over a large area or thickly, for removing the heat. In this context, the heat can be removed, in particular, to an external circuit environment, e.g. the circuit board CB.

FIG. 12 shows an arrangement of a duplexer component in which a circuit block in the third substrate SU3 comprises a power amplifier PA, at least one hybrid in IPD technology and a matching network MN. In a further circuit block, an antenna matching circuit in IPD technology ANT-IPD is arranged.

Thus, the second hybrid on the PA side is implemented on the same chip as the power amplifier itself. If the impedance of the hybrids should approximately correspond to the impedance of the power amplifier, the impedance transformation network MN must be provided. This can be implemented directly together with the power amplifier chip or as a separate chip.

The use of DSSP-type housing technology of the acoustic part of the duplexer in a housing is possible.

FIG. 13 shows an example of two 0°/90° hybrids HYB with inductive elements which are manufactured in IPD technology and arranged next to one another. This provides for a very compact construction having good electrical characteristics.

The duplexer is not restricted to one of the embodiments described or one of the examples of the figures shown. Combinations of the embodiments and of the features and variations which comprise, e.g., further circuit components such as further hybrids, further amplifiers, further passive circuit components and further substrates, also represent exemplary embodiments according to the invention.

LIST OF REFERENCE DESIGNATIONS

ANT: Antenna
AT: Antenna terminal
BPF1, BPF2: Bandpass filter
BPF3: Bandpass filter
BU: Bump connection
DU: Duplexer
FS: Filter structures
GND: Ground
HYB: Hybrid
HYB1, HYB2: First, second hybrid
HYB3, HYB4: Third, fourth hybrid
IE: Inductive element
IND: Inductive element
IPD1, IPD2: Integrated passive circuit components
LNA: Low-noise amplifier
MN1, MN2: Impedance matching networks
PA: Power amplifier
PAI: In-phase power amplifier
PAQ: Quadrature power amplifier
RE: Resistive element
RF: Receive filter
RT: Receive terminal
RXP: Receive signal path
SU1, SU2, SU3: Substrate
SWA: Switch arrangement
T1,T2,T3,T4: Terminals of a coupled transformer
TF: Transmit filter
TM: Metallization for heat removal
TT: Transmit terminal
TV: Thermal via
TXP: Transmit signal path

What is claimed is:

1. A duplexer comprising:
an antenna terminal;
a transmit terminal;
a receive terminal;
a first and second transmit filter;
a receive filter;
a first 90° hybrid having a first, second, third and fourth terminal, the antenna terminal being interconnected with the first terminal of the first hybrid, the receive filter being interconnected between the third terminal of the first hybrid and the receive terminal; and a second 90° hybrid having a first, second, third and fourth terminal, the first transmit filter being interconnected between the fourth terminal of the first hybrid and the second terminal of the second hybrid, the second transmit filter being interconnected between the second terminal of the first hybrid and the fourth terminal of the second hybrid, and the transmit terminal being interconnected with the first terminal of the second hybrid, wherein receive signals
are conveyed from the second and fourth terminals of the first hybrid to the first and second transmit filters,
are reflected by the first and second transmit filters, and
are conveyed to the receive filter via the third terminal of the first hybrid.

2. The duplexer of claim 1, wherein the first terminals of the first and second hybrids are input terminals and, between output signals of the second and fourth terminal of the first and second hybrids, a phase difference of about 90° is present.

3. The duplexer of claim 1, further comprising:
an impedance element which interconnects the third terminal of the second hybrid with ground.

4. The duplexer of claim 1, wherein each of the first and second hybrids outputs an RF power present at the respective first terminal in equal parts at the respective second and fourth terminals.

5. The duplexer of claim 1, wherein the first and second hybrids have the same configuration and/or the first and second transmit filters have the same configuration.

6. The duplexer of claim 1, wherein transmit signals at the third terminal of the first hybrid cancel one another.

7. The duplexer of claim 1, wherein a standing wave ratio on a transmit path is subject to lower fluctuations in a transmit frequency band than on a receive path in a receive frequency band.

8. The duplexer of claim 1, wherein transmit power is controlled by an envelope of a transmit signal in a control loop.

9. The duplexer of claim 1, further comprising:
a first power amplifier;
an in phase power amplifier;
a quadrature power amplifier;
a third and a fourth hybrid, each having a first, second, third and fourth terminal; and
a switch arrangement,
wherein the in phase power amplifier and the quadrature power amplifier are interconnected on parallel signal paths between the second and fourth terminals of the third and fourth hybrids, and the switch arrangement interconnects the second terminals of the third and fourth hybrids either in each case with ground or with one another.

10. The duplexer of claim 1, wherein the center frequency of the second hybrid is moved towards the center frequency of a transmit frequency band.

11. The duplexer of claim 1, wherein at least one of the first or second hybrids comprises coupled transformers.

* * * * *